United States Patent
Harrold et al.

[11] Patent Number: 5,838,360
[45] Date of Patent: Nov. 17, 1998

[54] METHOD OF AND APPARATUS FOR MAKING A PRINT CONTAINING PARALLAX INFORMATION

[75] Inventors: Jonathan Harrold; Graham John Woodgate; David Ezra, all of Oxfordshire, United Kingdom

[73] Assignee: Sharp Kabushiki Kaisha, Osaka, Japan

[21] Appl. No.: 355,065

[22] Filed: Dec. 13, 1994

[30] Foreign Application Priority Data

Dec. 14, 1993 [GB] United Kingdom .................... 9325596

[51] Int. Cl.⁶ .............................. B41J 2/47; G01D 15/34; G02B 26/00; G02B 27/00
[52] U.S. Cl. ............................ 347/258; 347/41; 347/137; 355/46; 355/22; 352/57
[58] Field of Search ................................ 352/57; 347/62, 347/232, 258, 238, 245, 131, 137, 41, 43; 358/302, 500; 346/139 R, 76 Z; 355/46, 21, 22, 24, 26, 54

[56] References Cited

U.S. PATENT DOCUMENTS

| | | | |
|---|---|---|---|
| 4,459,512 | 7/1984 | Ohhata | 315/10 |
| 5,105,281 | 4/1992 | Kusaka | 247/232 |
| 5,248,992 | 9/1993 | Ferschl | 347/258 |
| 5,279,912 | 1/1994 | Telfer et al. | 430/17 |
| 5,703,717 | 12/1997 | Ezra et al. | 359/463 |

FOREIGN PATENT DOCUMENTS

| | | |
|---|---|---|
| 0354851 | 2/1990 | European Pat. Off. . |
| 0404289 | 12/1990 | European Pat. Off. . |
| 0439152 | 7/1991 | European Pat. Off. . |
| 0520179 | 12/1992 | European Pat. Off. . |
| 0566125 | 10/1993 | European Pat. Off. . |
| 2028938 | 12/1971 | Germany . |
| 2271903 | 4/1994 | United Kingdom . |
| 9008343 | 7/1990 | WIPO . |
| 9110310 | 7/1991 | WIPO . |

OTHER PUBLICATIONS

Search Report for European Appl. 94309335.1, mailed Nov. 30, 1995.

New Scientist, Sep. 1992, "Advertising Gains a New Dimension," p. 19.

Love et al, SPIE, vol. 1083, 1989, "Computer Generated Lenticular Stereograms," pp. 102–107.

Primary Examiner—N. Le
Assistant Examiner—Raquel Yvette Gordon

[57] ABSTRACT

A 3D printer comprises a scanning laser system. A donor sheet is located in the focal plane of the optical system and carries a thermally transferable colourant such as a dye or pigment. A lenticular screen has a colourant receiving layer which receives colourant from the donor sheet to form 3D pixels, each comprising interlaced 2D pixels, aligned with lenticules of the screen. A detector array responds to laser light which has been transmitted through the lenticular screen, and a print register control system uses the detector output correctly to position the scanning laser beam to compensate for irregularities in the lenticular screen.

18 Claims, 11 Drawing Sheets

METHOD OF AND APPARATUS FOR MAKING A PRINT CONTAINING PARALLAX INFORMATION

The present invention relates to a method of and an apparatus for making a print containing parallax information. Such a method and apparatus may be used to provide a printer for producing 3D (three dimensional) hard-copy in full-colour, which printer can be implemented with technology consistent with a low cost device capable of operation as, for example, a computer peripheral or fax in an office environment.

True 3D displays can provide substantially more information than 2D displays. There are many applications such as medical imaging and CAD systems which can benefit from 3D visualisation. Hard-copy allows this information to be disseminated effectively, particularly if the image can be produced as an output from a computer workstation (using computer graphic techniques or digitally captured images). To be effective, there is a need for a computer peripheral printer with high speed production technique, ease of use, low cost and convenience of manufacture. Furthermore, it is very desirable to be able to view the 3D hard-copy without the use of special viewing aids. This implies that an autostereoscopic 3D technology is required.

A known technique for computer-based 3D hard-copy production involves multiplexed holography. In this method, computer graphic or photographic techniques are applied to a 3D data base to construct a sequence of 2D images on a photographic film, which images are holographically multiplexed to produce a 3D image. Recently there have been suggestions to replace the photographic film with an LCD (liquid crystal device) as the projection medium in order to speed production. However, these techniques have problems concerning cost, true colour, reproduction, materials, illumination requirements, and hardware fabrication. These problems are not likely to be substantially overcome in the foreseeable future. All these make holographic methods impractical for general use as an office computer peripheral printer.

Known non-holographic techniques for 3D hard-copy production include lenticular, microlens and barrier parallax methods. Lenticular methods are generally superior to barrier parallax in their brightness. Indeed, lenticular hard-copy displays produced using photographic methods are quite impressive. Here a special camera arrangement is used to produce a continuous composite image which can be viewed with minimum limitations of viewing distance. However, these methods are not suitable for computer generated or other digital applications.

In computer generation and other digital applications (video capture for example), it is impossible to produce a continuous composite image, but instead a finite number of discrete views must be merged. It is necessary to have a large number of views for improved 3D image quality for more flexible viewing geometry. Each of the 2D images is a view of the object from a particular direction, and is replayed in that direction. The accuracy of the 3D image increases as the number of 2D views displayed increases. The actual creation of the 3D hardcopy can use an optical recording method (projection through an LCD device), on photographic film or digital printing techniques on photographic film (New Scientist 26 Sep. 1992 p19). While these methods are capable of producing high quality multi view images due to the high resolution offered by photographic film, they suffer from two limitations:

1. Photographic processing
2. Difficulties in registration due to size changes as a result of the processing or temperature/humidity changes.

For these reasons, and particularly the first one, these methods are not suited for an office peripheral printer application.

Methods using direct electronic printing techniques have been reported by S. Love and D. McAllister in SPIE Vol.1083 (1989) p.102.

Previous attempts to produce non-holographic 3D hard-copy in which an image is printed on to a substrate which is subsequently sandwiched with a lenticular sheet have suffered from a number of problems. These include lack of printer resolution, lack of precision in the positioning of pixels in the printed output, (insufficient printer accuracy with high addressability), extreme difficulty in registering the separate printed media with the lenticular sheet, cross talk of the images, Moire fringing and lack of views causing significant image flipping.

In U.S. patent application Ser. No. 08/139,289 which was filed on Oct. 20, 1993, now abandoned a method of making a print containing parallax information was disclosed, comprising writing a plurality of picture elements onto a first substrate, which comprises a lens array substrate or a parallax barrier substrate, wherein each of the picture elements is aligned with a respective lens of the lens array substrate or a respective aperture of the parallax barrier substrate, and wherein each of the picture elements comprises a plurality of interlaced image elements from respective images Such a method may be used to make 3D prints. However, such a method may also be used to provide prints containing other parallax information, for instance signs which provide different information when viewed from different directions.

In one example, the transfer of colourant by means of a scanning beam was disclosed, the beam being registered with the lenses of the lens array sheet or the apertures of the parallax barrier sheet during or before transfer. For instance, the lenses or apertures may be scanned before transfer, the transitions between the lenses or the locations of the apertures registered, and the beam aligned thereto during transfer. Alternatively or additionally, registration means were to be provided on the lens array sheet or on the parallax barrier sheet outside an image area thereof.

EP-A-0569 896 discloses a method of printing a 3D image onto the back of a lenticular sheet carrying a radiation-sensitive layer which undergoes a change of colour when exposed to radiation of a suitable wavelength. Several such layers are required for producing colour prints. Simultaneously, a beam of collimated radiation is directed onto the lenticules, which focus it through the back of the sheet to a region where the intensity of the radiation varies periodically. A solid state imager is moved within this region so as to detect this periodicity, which corresponds to the spacing between lenticules. Timing circuits receive the imager signals and control modulation of the writing radiation so as to control registration of the printed 3D image with the lenticules of the sheet.

The writing radiation, for instance supplied by one or more infrared lasers, does not pass through the lenticules but instead is beamed directly onto the back of the lenticular sheet carrying the one or more radiation-sensitive layers. The collimated radiation, which is of a wavelength such as not to image the radiation-sensitive layers, has to be scanned over several lenticules so as to create a periodically varying intensity region. This region therefore has to be spaced from the writing region so as to avoid physical interference, for instance between the writing and registration beams. Accurate registration therefore relies on the consistency of the lenticules of the sheet as regards pitch and optical properties. Tolerances or errors in manufacture thus give rise to errors in registration.

The purpose of the present invention is to improve the accuracy of registration of the printed image with the lenticular elements or the parallax barrier elements, as the case may be. It is now recognised that difficulties arise when the scanning for registration purposes is carried out before the transfer printing process, because of variations in the pitch and particularly the thickness of the manufactured substrates. Moreover, registration using registration means provided outside the image-bearing area of the substrate, even if carried out as part of the printing step, fails to take account of variations in pitch and thickness over the image-bearing area.

According to a first aspect of the invention, there is provided a method as defined in the appended claim 1.

According to a second aspect of the invention, there is provided an apparatus as defined in the appended claim 14.

Preferred embodiments of the invention are defined in the other appended claims.

By detecting and controlling registration at or adjacent the picture element currently being written, it is possible to ensure accurate registration between the picture elements and the lens array or parallax barrier. Thus, variations and tolerances in the lens array or parallax barrier can be accommodated without loss of adequate registration across the whole print.

The invention will be further described, by way of example, with reference to the accompanying drawings, in which.

The method and apparatus described hereinafter are used to print a 3D hard-copy of an image which has been captured or synthesised as a number of pixellated 2D views of an object from a range of positions. The 2D views may, for instance, have been captured by means of suitable photographic or video cameras using frame-store equipment or photographic scanning techniques. Alternatively, the views may have been synthesised, for instance by direct computer generation.

The method and apparatus shown in FIGS. 1 to 5 is described fully in the copending patent application referred to above, to which reference should be made for further information, and it is the arrangements shown in FIGS. 7a to 12 which are specific to embodiments of the present invention. Nevertheless, the arrangements of FIGS. 1 to 5 will now be described briefly.

Figure 1:
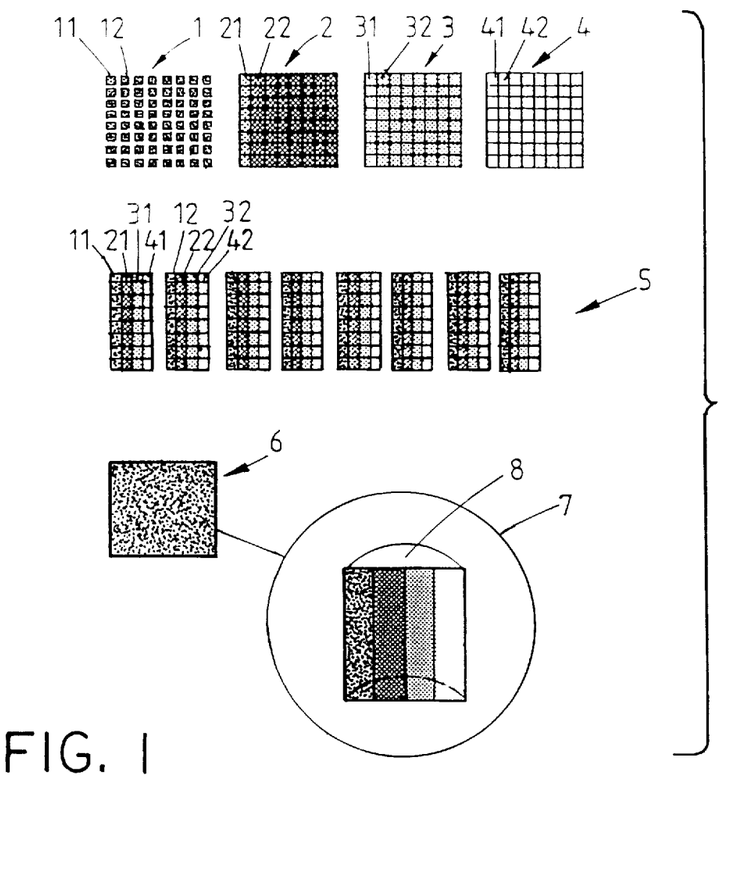
FIG. 1 illustrates steps in the formation of a 3D image in a method constituting an embodiment of the invention of the copending application referred to above.

FIG. 1 illustrates four pixellated 2D views 1 to 4 which have been captured or synthesised as described above. Each view is pixellated into a regular rectangular array of pixels. The four views 1 to 4 are then vertically interlaced as illustrated at 5 such that the first picture elements 11, 12, 31, and 41 of the views 1 to 4 are juxtaposed to form a first row of a first vertical slice, followed by the second picture elements 12, 22, 32, and 42 to form the first row of the next vertical slice, and so on. The aspect ratio of the resulting interlaced 3D image is then reduced by compressing the horizontal axis to provide the 3D image 6. The horizontally compressed pixels are shown in the enlarged portion 7 in registration with a lenticule 8 of a lenticular sheet onto the back of which the pixels are printed.

Figure 2:
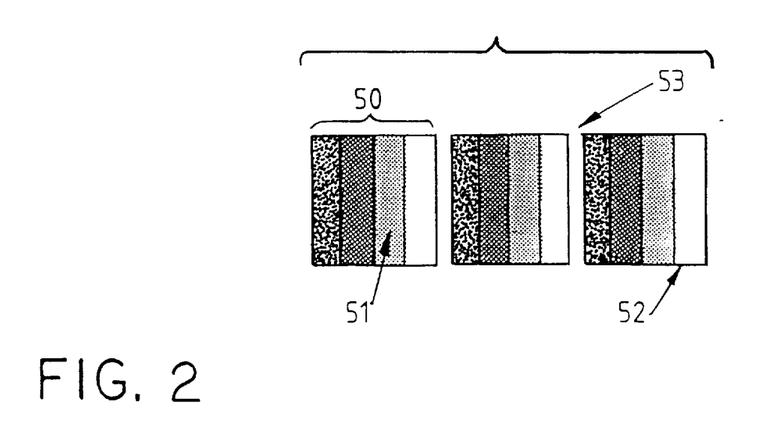
FIG. 2 illustrates the arrangement of 3D picture elements (pixels) produced by the steps illustrated in FIG. 1.

FIG. 2 illustrates the arrangement of 3D pixels 50, each of which is made up of four 2D pixels 51 in the four view arrangement shown in the drawings. In order to avoid the appearance of unwanted artefacts in the 3D image, adjacent 2D pixels are contiguous with each other as shown at 52 but do not substantially overlap with each other. The 3D pixels 50 are not required to be contiguous and a gap 53 between adjacent 3D pixels may be provided so as to ensure that no overlapping occurs and to ease registration with the lenticular sheet. It may be advantageous to write "black" non-reflective and/or non-transmissive data in these gaps.

The resolution of the lenticular sheet, which defines the horizontal resolution of the 3D image, is preferably selected so that, at the intended typical viewing distance, the screen structure is substantially invisible. For relatively small images, the pitch of the elements of the lenticular sheet may be substantially equal to the pitch of the 3D pixels and the height of the pixels may be of the order of the lenticular pitch. However, it may be advantageous to enhance the appearance of the image by using a vertical resolution which is greater than the lenticular pitch. This allows the constraints on the lenticular resolution to be relaxed, thus simplifying system design.

Figure 3:
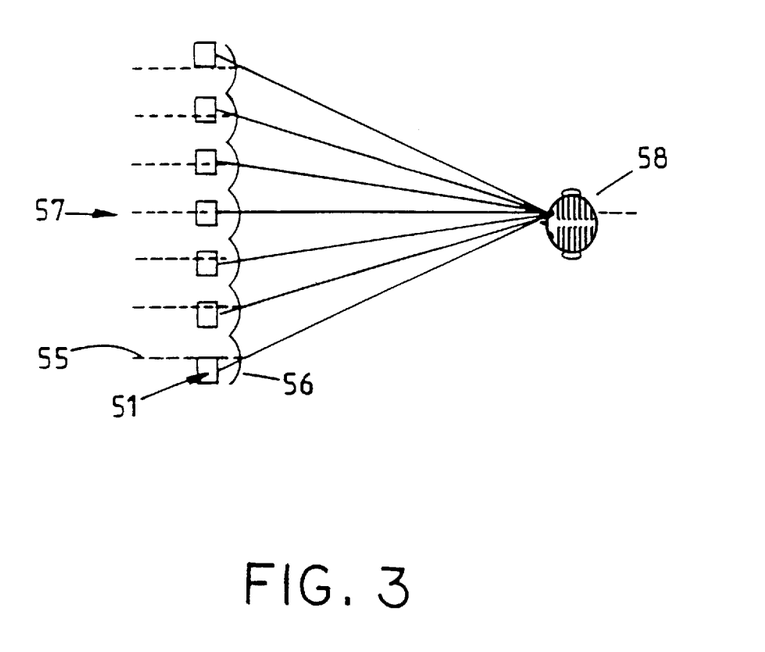
FIG. 3 illustrates an example of the relative alignment between a lenticular screen and 3D pixels.

The finite size of the 2D image pixels means that the resulting 3D image appears to be made up of a number of slices of the views of width dependent on the lenticular sheet geometry, the 2D pixel width, and the observer position. If a small number of views is available and/or if a relatively wide image is to be printed, then there may be insufficient slices to fill the visual field of the observer with 3D views. In particular, each eye of the observer may see different 2D views across the width of the hard-copy, thus destroying the 3D effect. In this case, the pitch of the elements of the lenticular sheet may be made slightly less than the pitch of the 3D pixels so as to ensure that each eye of the observer sees the same 2D view across the whole width of the hard-copy. This is illustrated in FIG. 3, in which the 3D pixels 51 are offset with respect to optical axes 55 of the elements 56 of the lenticular sheet by amounts which increase with distance from the centre 57 of the hard-copy. This ensures that each eye of the observer 58 sees a 2D pixel from the same 2D image across the whole width of the hard-copy.

Colour-printing may be achieved by over-printing pixels of different colours or by printing different 2D colour pixels vertically above each other, thus taking advantage of the extra vertical resolution afforded by the rectangular shaped 2D pixels. Crosstalk or over writing of a 2D image pixel with information from an adjacent pixel must be limited, for instance to less than 5%, so as to avoid loss of the 3D effect. Consequently, registration of colours in colour printing is important and must be carefully controlled. Although circular printing spots may be used, non-circular spots may be used in order to improve the production of sharp edges at the edges of the 2D pixels, or for reasons of system simplification.

At the edge of the 3D print, off-axis aberration of the image may become significant. This may be relieved at least partially by the use of a substrate of the type disclosed in EP-A-404289.

Care has to be taken to avoid the production of Moire fringes generated by beating between harmonics of the printed pixels and the lenticular sheet pitch. This may be achieved by ensuring relatively precise registration of the printed pixels with the lenticules of the lenticular sheet. Further, the quality of the lenticular sheet should be controlled to minimise surface reflections and scattering and to provide resistance to scratching. The sheet should also be relatively free from inhomogeneities.

In order to provide a 3D print of A4 standard size to be viewable by an observer located between 500 and 1,000 millimetres from the print, assuming that the limit of visual acuity is of the order of 1/2000, the lenticular pitch of the lenticular sheet is preferably between 250 and 500 micrometers to prevent the lenticular structure from being highly visible. As the number of 2D views increases, the degree of motion parallax in the 3D image increases. For example, the number of views may be 10.Therefore, the width of each of the 2D pixel image stripes is of the order of 25 micrometers. The 2D pixel height will be of the order of 250 micrometers. If the 3D print is viewed in projection (as aforementioned), then the stripe width of each of the 2D pixel image stripes is reduced proportionally to the magnifications.

The lateral freedom of movement of the observer can be restricted to approximately 200 millimetres using lenticular techniques. Thus, the focal length of the lenticules should be approximately 625 micrometers.

In such a printed hard-copy, the observer may see a sliced 3D image which extends over only 200 millimetres. Thus, with the A4 size sheet having its major axis disposed horizontally, the views will repeat at the edges of the print, thus producing erroneous information. In order to fill the print with one complete view for each eye, as illustrated in FIG. 3, the relative positions of the 3D pixels with respect to the centres of the lenticules increase from the centre towards the edges of the print. By increasing the relative horizontal position of the 3D pixels with respect to the optical axes of the lenticules by 13 micrometers for each 10 mm displacement away from the centre of the print, this problem can be overcome and each eye of the observer sees a single 2D view across the whole width of the print.

In order to provide 3D pixels whose minimum dimensions are of the order of 25 micrometers, printing to a resolution of 1,000 dots per inch (dpi) is required. Further, this resolution is desirable for a pixel capable of intrinsic grey-scale. However, if the printing process cannot produce intrinsic grey-scale, then increased resolution would be required. The positional integrity or addressability should be about ten times the resolution and is therefore required to be approximately 2.5 micrometers. Further, the positional accuracy of the printed pixels under each lenticule with respect to the geometry of the lenticule needs to be maintained across the whole width of the lenticular sheet. Although this could be achieved by manufacturing the lenticular sheet accurately with regard to lenticule-to-lenticule spacing and thickness, this would be relatively expensive to achieve. This requirement on resolution may be substantially relaxed by ensuring that the "writing beam" in the printing technique described hereinafter is registered to the lenticules of the lenticular sheet during the writing process. This technique also has the advantage that it can tolerate an amount of skew in the positioning of the lenticular sheet with respect to the writing beam. Print registration control, using the present invention, will be described below with reference to FIGS. 7a to 12.

The printing technique employed in the preferred embodiment is laser induced thermal transfer, for instance of the type described in WO 91/10310. This technique, which is capable of continuous tone and half tone, employs a focused laser beam and is capable of achieving the necessary precision, for instance as described hereinabove. The printing resolution is then dependent on a scanning system, and is achievable at reasonable cost using known technology.

Printing is performed by scanning a modulated laser beam in accordance with a raster-scan pattern. The laser beam scans a suitable dry donor sheet which absorbs the focused laser light and converts the energy to heat, which then causes the transfer of a colourant from the heated area to the back of the lenticular sheet. The back of the lenticular sheet may be coated or laminated with any suitable material onto which a comparatively stable image can be deposited. This may, for instance, comprise a copolymer such as PVC or polyester.

A raster scan pattern has a "fast scan" axis and a "slow scan" axis and there are two main possible orientations for the fast scan axis with respect to the lenticules of the lenticular sheet, namely scanning along each lenticule, and scanning substantially perpendicularly to the lenticules. Fast-scanning along the lenticules is illustrated at 70 in FIG. 4 whereas fast-scanning perpendicularly to the lenticules is illustrated at 71.

Figure 4:
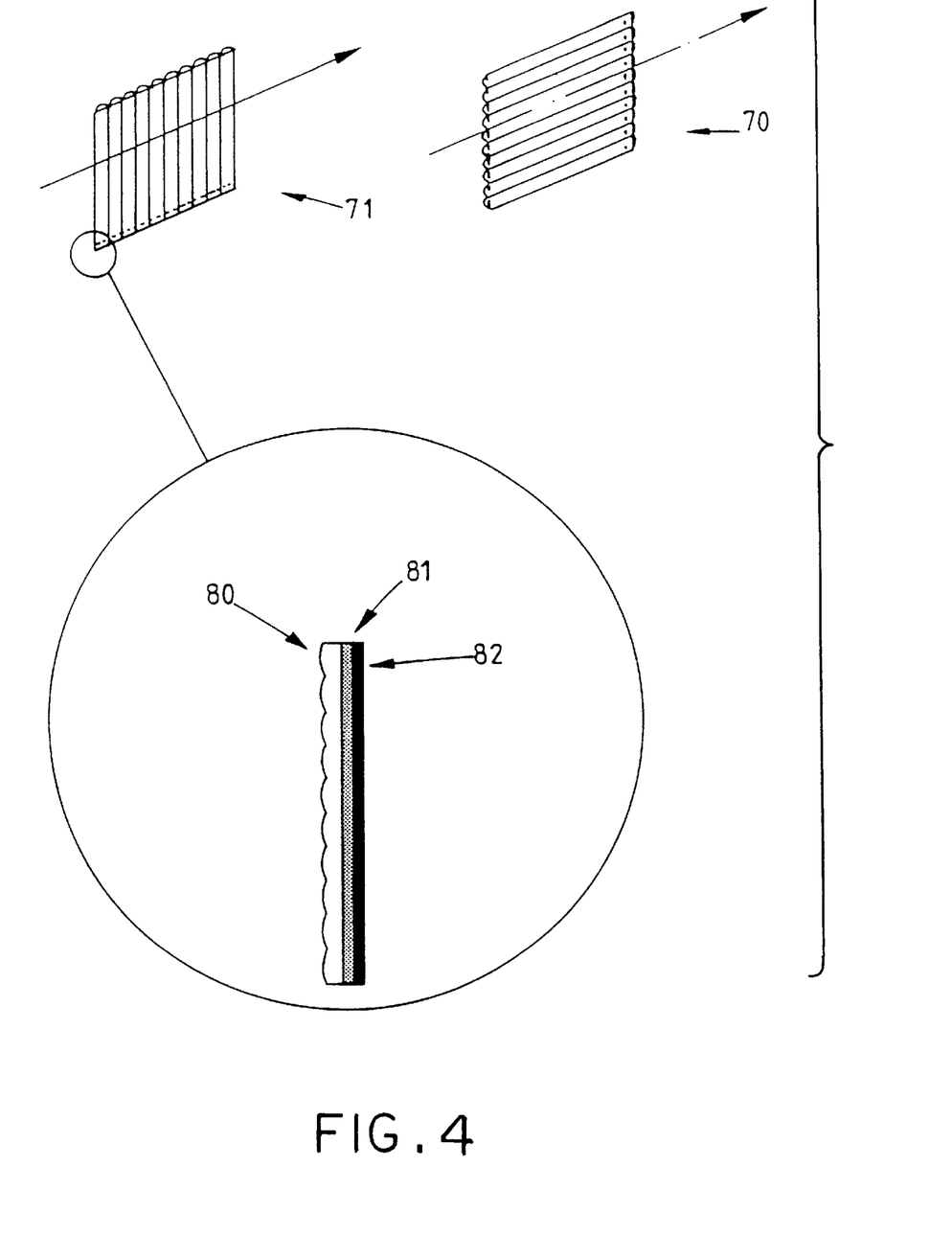
FIG. 4 illustrates two substrate orientations with respect to a fast scan axis of a printer.

FIG. 4 shows an enlarged cross-sectional view of the edge of the print. During printing, a lenticular sheet 80 backed by a colourant receiving layer 81 receives colourant in accordance with the image to be printed from a colour donor sheet 82. The scanning beams are focused onto the donor sheet 82 and are modulated so as to vary the quantity of colourant transferred to the receiving layer 81 in accordance with the image to be printed.

Figure 5:
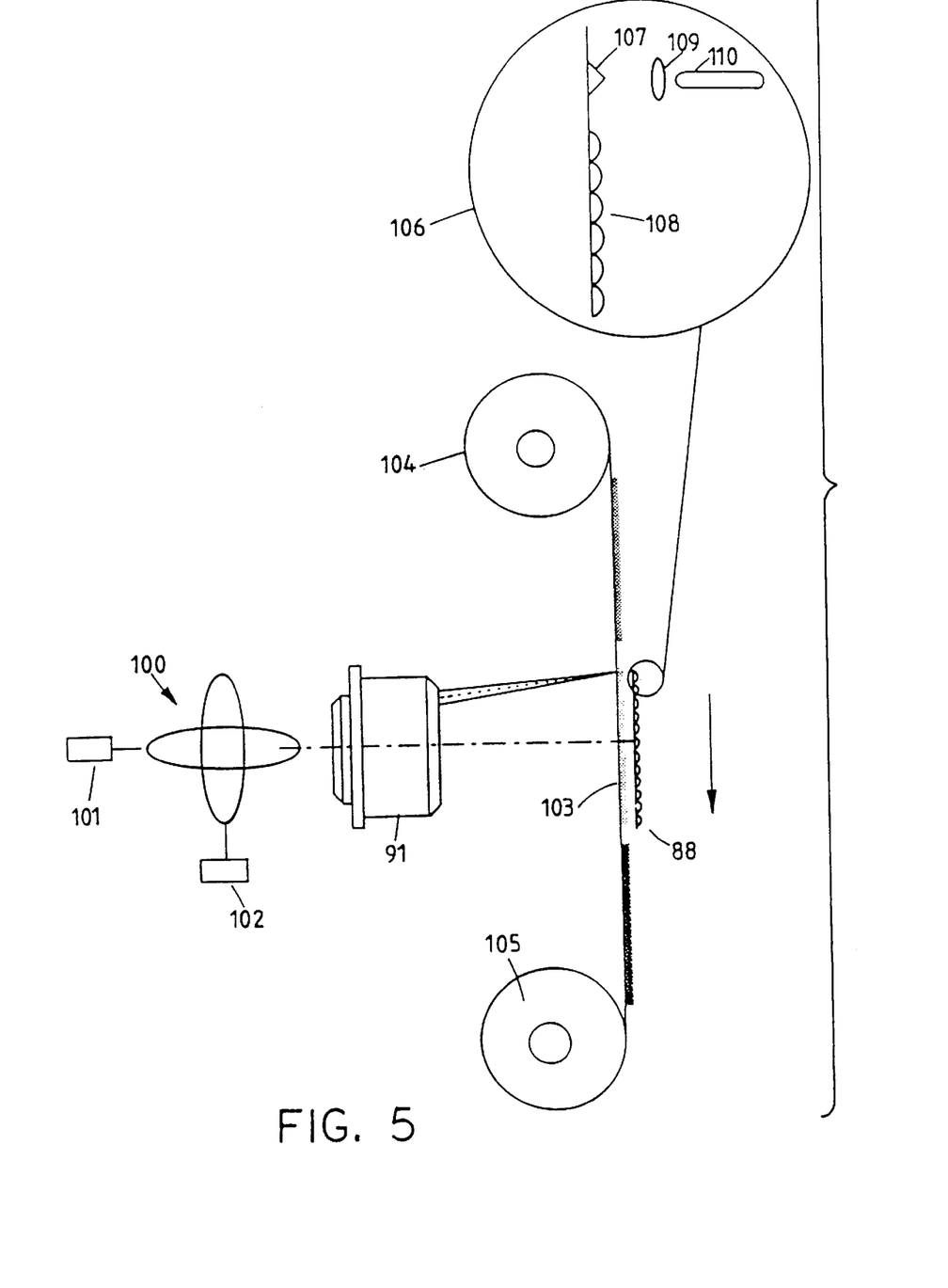
FIG. 5 shows diagrammatically a printer constituting an embodiment of the invention of the copending application referred to above.

FIG. 5 illustrates diagrammatically a printing apparatus adopting a pre-objective scanning technique. A light source (not shown), comprising a laser diode whose output is modulated in accordance with the image to be printed, directs a writing beam to a two-axis scanning system 100 incorporating positional encoders 101 and 102 forming part of a feedback servo-control loop for controlling accurate scanning of the writing beam. The collimated and scanned writing beam is focused by the optical system 91 onto a trichromat donor sheet 103 carrying a suitable dye and supplied from a feed spool 104 to a take-up spool 105 After printing of each lenticular sheet, the donor sheet is advanced so as to locate a fresh portion at the printing region for printing the next lenticular sheet. The lenticular sheet 88 is located adjacent the donor sheet 103 at the printing region during printing, and suitable feed and removal means are provided so as to automate the printing process. As shown in the enlarged portion 106, the lenticular sheet has a "start of sheet" prism 107 located with respect to the lenticules 108 so as to cooperate with a suitable optical system 109 and photodetector 110 to provide coarse registration control for the printing of the 3D pixels in registration with the lenticules 108. The start of scan prism 107 may be located at a corner of the sheet outside the image area and may extend linearly so as to provide a readily detectable reference position or line on the lenticular sheet 88 for use by the scanning system to ensure correct registration.

Figure 6:
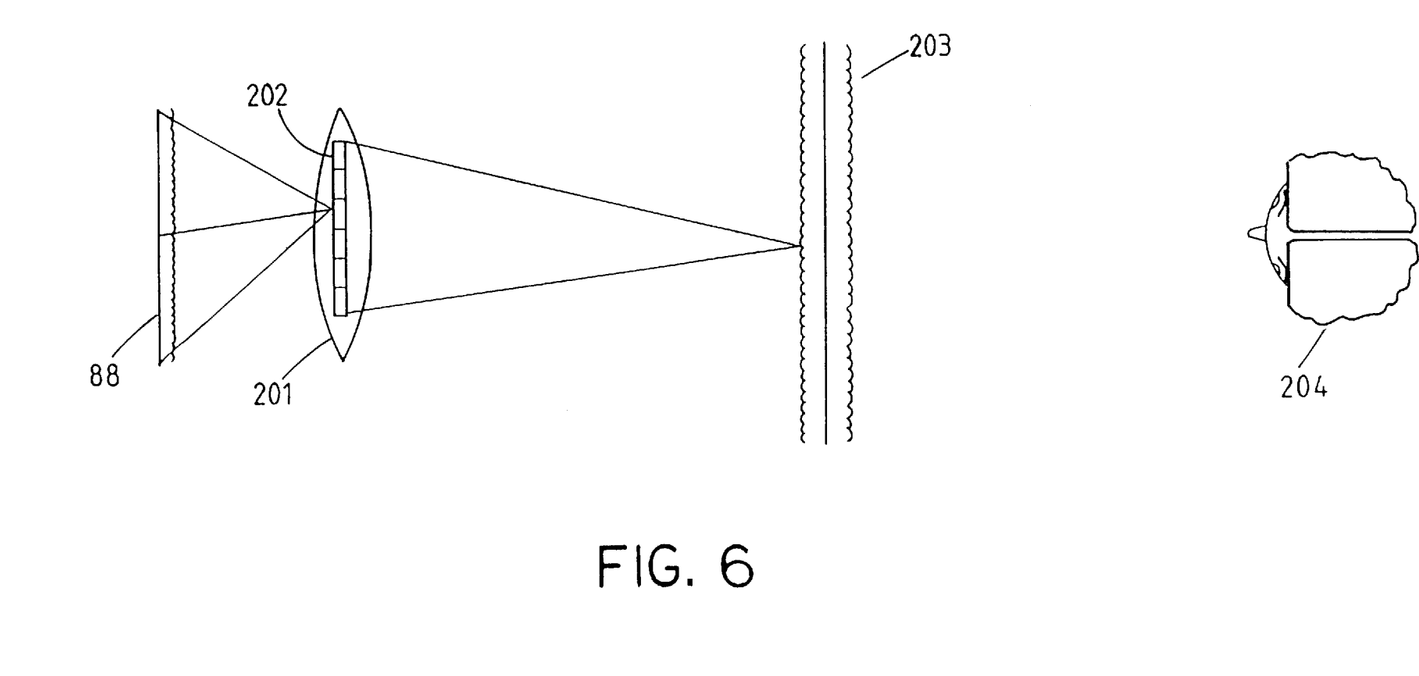
FIG. 6 illustrates the projection and viewing of a 3D colour print.

FIG. 6 illustrates diagrammatically the projection of printed lenticular images and the viewing thereof, for instance as disclosed in our copending British Patent Application No. 9323402.9, filed on 12 Nov. 1993 (Marks & Clerk ref. no. 230P67614). A back-illuminated 3D colour image 88 generates a number of output cones reaching different imaginary windows 202 shown schematically in the plane of a projection lens 201. Each output cone corresponds to a different view of the same original image, thereby providing parallax. The diameter of the input aperture of the projection lens 201 substantially corresponds to the aggregate width of the imaginary windows 202 in the plane of the lens. The image is projected onto an auto-collimating or angular amplifying screen 203, comprising two plano-lenticular screens placed back-to-back, the lenticular screens having different pitches. The 3D image is then viewable by an observer 204 at an appropriate distance from the screen 203.

Figure 7A:
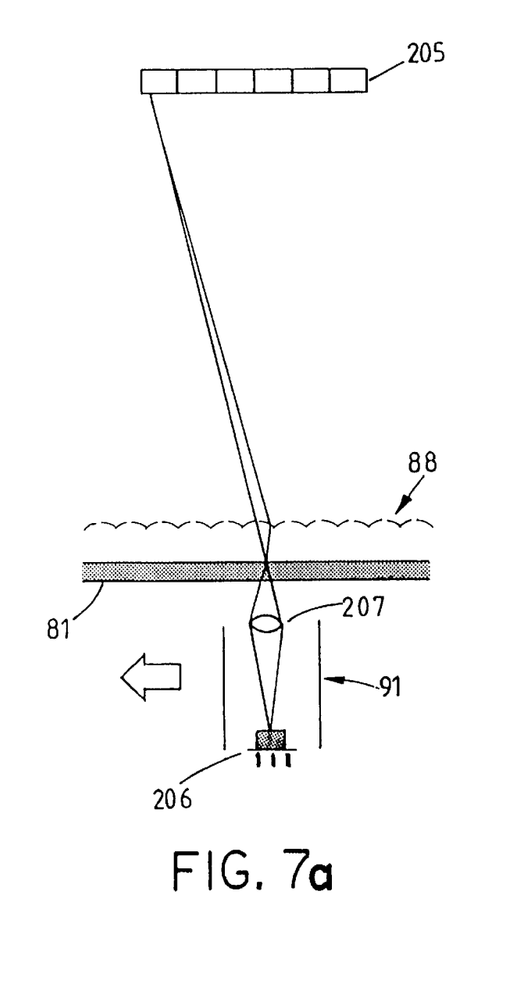
FIGS. 7a and 7b illustrate successive stages, at times t and t+dt respectively, of a position sensing and print register control method constituting an embodiment of the present invention, showing printing apparatus schematically in a section through the substrate being printed.
Figure 7B:
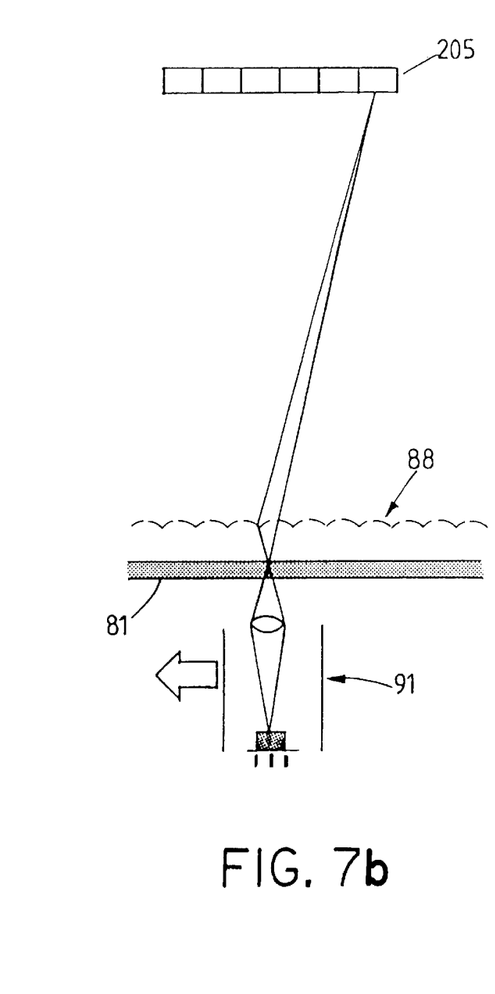

The first embodiment of the invention will now be described with reference to FIGS. 7a and 7b. A beam-scanning optical system 91 comprises a laser source 206 and a focusing lens 207, and an arrangement for scanning the writing beam in two dimensions in a plane parallel to the lenticular sheet 88 to be printed. FIG. 7a and FIG. 7b are sections through the lenticular sheet 88, taken along the fast axis, i.e. perpendicular to the lenticules. Some of the light which is used for causing colourant transfer emerges from the other side of the lenticular sheet 88, and this transmitted light is used for print registration control. Thus the light is transmitted through the lenticule corresponding to the picture element being printed, and it is re-imaged onto a detector array 205. The detector array 205 is positioned in a plane corresponding to the desired position of the output windows 202, FIG. 6.

The detector array comprises a linear arrangement of detector elements, each of which provides a signal indicative of the detection of transmitted laser light. In this example, the number of detector elements corresponds to the number of windows, i.e. the number of different parallax views.

As the first view is being written onto the first lenticule at time t, transmitted light should fall onto the first detector, as shown in FIG. 7a, if the scanning optical system 91 is in correct register with the lenticular sheet 88. If the first detector element fails to detect light at this time, the laser scanning system adjusts the position of the writing beam until light is detected correctly in the first detector element. The writing beam scans along the fast axis, to write successive views on the first lenticule, up to the sixth view in this example, at time t+dt, as shown in FIG. 7b. During the writing of each successive view onto this lenticule, the corresponding detector element of the array 205 should be illuminated, and the position of the writing beam is adjusted, using the same positional feedback mechanism, to achieve correct registration. This cycle is then repeated, with the writing beam still further along the fast axis, for the writing of the six views onto the lenticular sheet 88 beneath the second lenticule. The process is then repeated for the third and subsequent lenticules. The writing beam then moves along the slow axis, transverse to the fast axis, and the next series of images is printed. As an alternative to adjusting the scanning of the writing beam, the timing of the supply of data to control the laser may be adjusted with respect to the detector signals so as to ensure correct 3D view registration.

Figure 8:
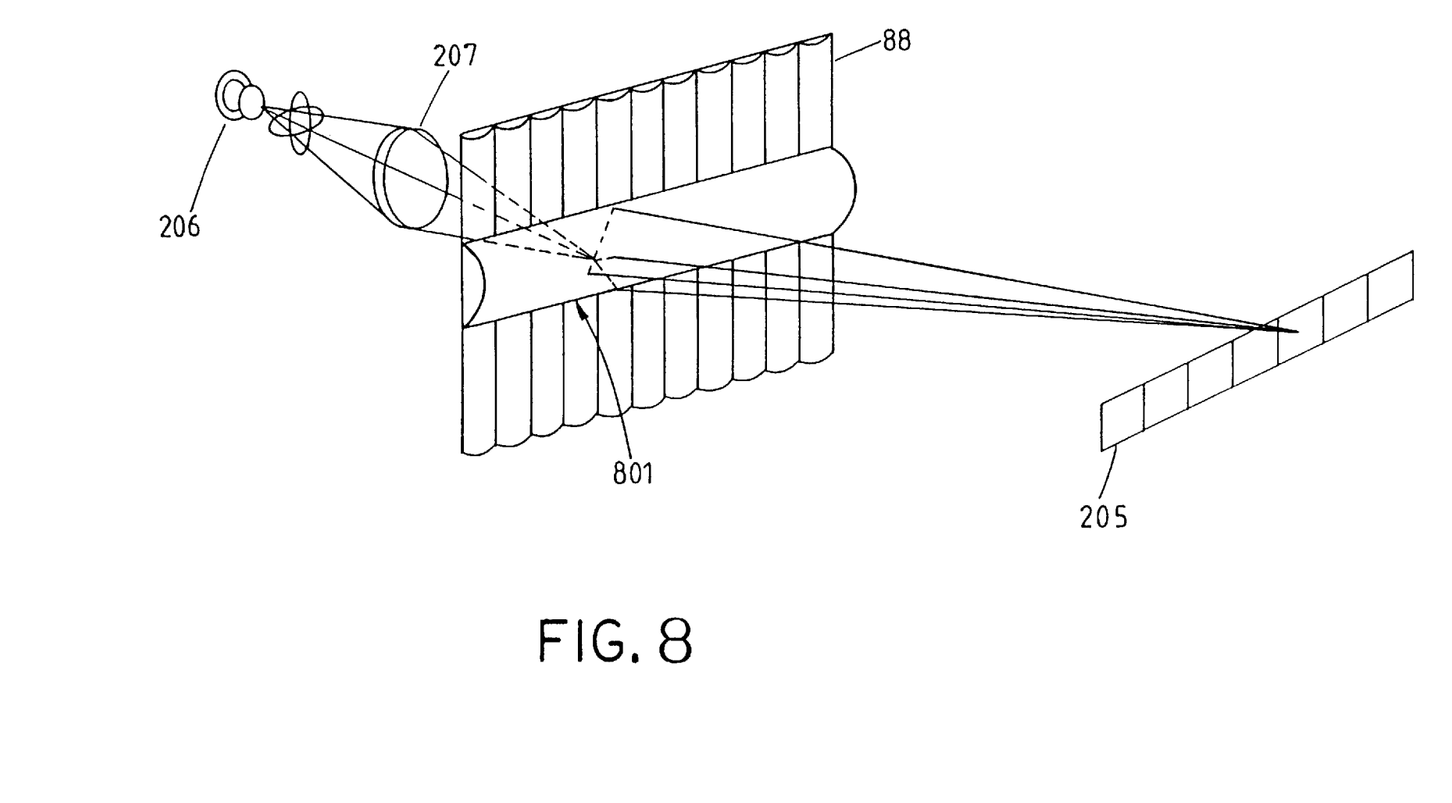
FIG. 8 is a schematic perspective view of the printing apparatus of FIGS. 7a and 7b, further including a cylindrical lens for improving brightness at the detector.
Figure 11:
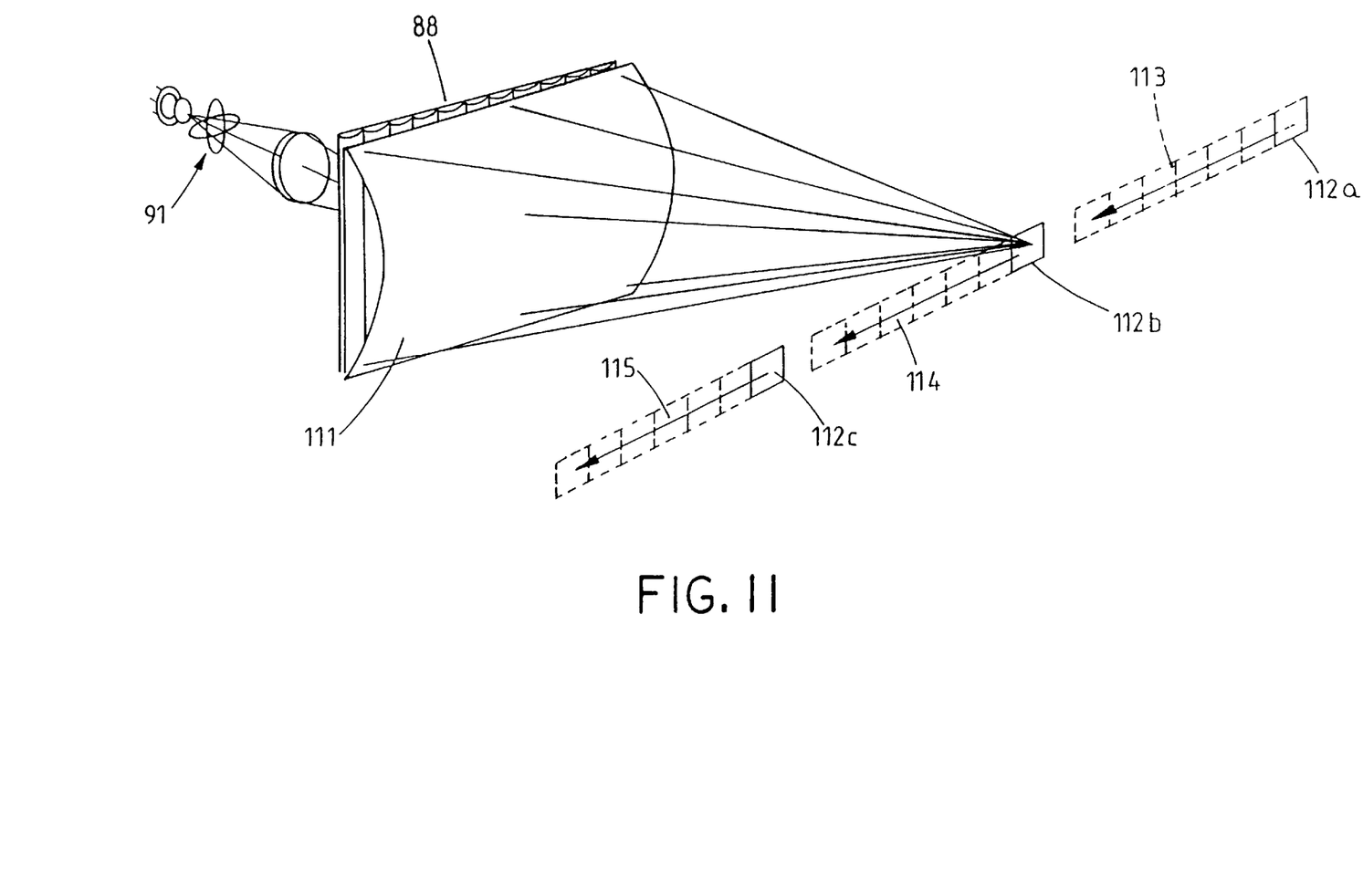
FIG. 11 is a perspective view corresponding to FIG. 8 but showing a larger cylindrical lens and illustrating the detection of different lobes of the transmitted light.

As shown schematically in FIGS. 8 and 11, an additional cylindrical lens may be positioned adjacent the lenticular sheet 88 facing the lenticules, to increase the power density at the detector array. In the example of FIG. 8, the cylindrical lens 801 is arranged with its axis parallel to the fast axis of the lenticular sheet 88, and covers only a central region of each lenticule. Where the print is intended for direct view, the lens length would be 210 mm with a focal length of 1000 mm. Where the print is intended for projection as shown for example in FIG. 6, the lens length would be 70 mm and its focal length would be 167 mm, for example.

The cylindrical lens 111 of FIG. 11 has the same function as the lens 801 of FIG. 8, but it covers the entire lenticular sheet 88. This may be particularly appropriate for small size images intended for subsequent projection viewing.

Instead of cylindrical lenses, as illustrated in FIGS. 8 and 11, it would be possible to employ Fresnel zone plates with similar image conjugates.

Figure 9:
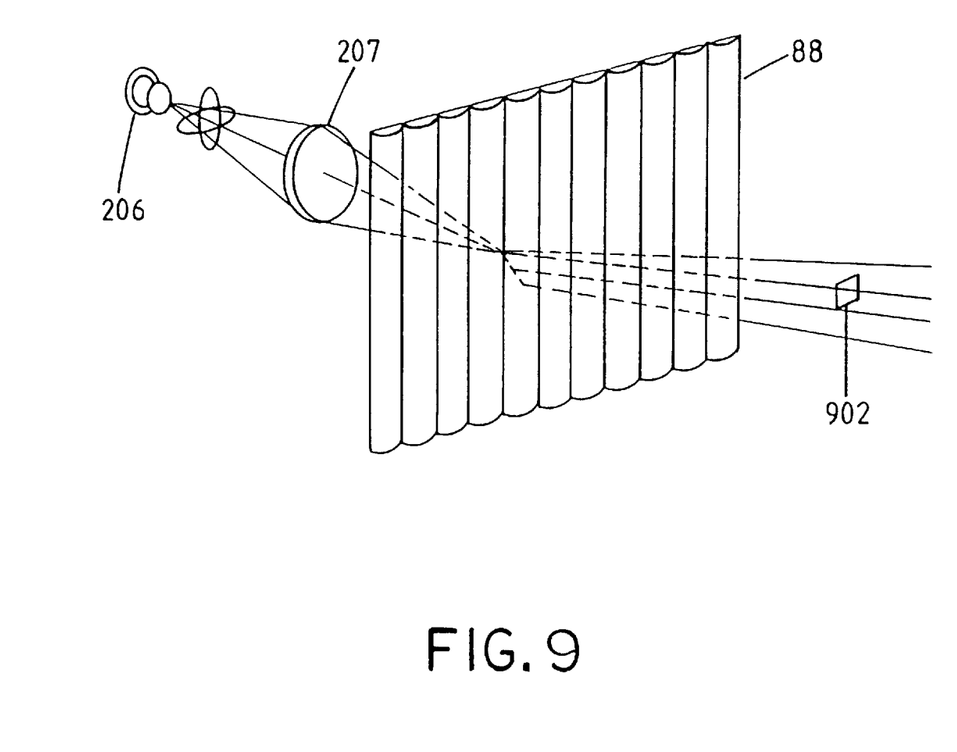
FIG. 9 is a view corresponding to FIG. 8, but without the cylindrical lens, showing an alternative form of detector.

As shown in FIG. 9, the array 205 of detector elements can be replaced with just one detector 902, or alternatively with a plural number of detectors lower than the total number of views for each lenticule. The print register control system then responds to the detection of the limited number of views, to interpolate the position of the remaining views which cannot be detected directly. The number of detector elements can be selected in accordance with the required accuracy of register control.

Whilst in the examples described it is imaging light which is used for register control, it would, as an alternative, be possible to use a subsidiary beam from the optical system 91, for example a subsidiary laser source. The subsidiary laser source would necessarily scan in sychronization with the writing laser source, and it would be transmitted through the same portion of the lenticular sheet 88. Such a laser need not have substantially the same wavelength as the writing beam and could therefore avoid peaks in dye sheet absorption.

In one example of a print suitable for direct view, the number of lenticules is 525 at a pitch of 0.4 mm, each picture element comprising 18 different views. For print register control, a linear detector array of 18 elements, having a total length of 120 mm, is placed parallel to the lenticular sheet and 1 m from it. Thus the separation between adjacent detector elements is 6.7 mm.

In an example of a print suitable for projection, the number of lenticules is 525 at a pitch of 133 $\mu$m, each picture element comprising 18 different views. For print register control, a linear detector array of 18 elements having a total length of 30 mm is placed parallel to the lenticular sheet and 167 mm from it.

Thus the separation between adjacent detector elements is 1.7 mm. On completion, the printed lenticular image can be placed in a projection system as shown in the arrangement of FIG. 6. This projects an image onto a 3:1 angular amplifying screen using a 125 mm focal length f#4 projection lens. An observer positioned 500 mm from the rear of the angular amplifying screen will see 18 views of an image of size 210 mm over a lateral range of 90 mm.

In the examples given, if the incident laser power is 100 mW, and if the maximum absorption from three superimposed dye sheets at the laser wavelength corresponds to total optical density 3 (OD3), then the use of the additional lenses as shown in FIG. 8 (cylindrical lens 801) would deliver a received power of 40 uW at each detector element.

Figure 10A:
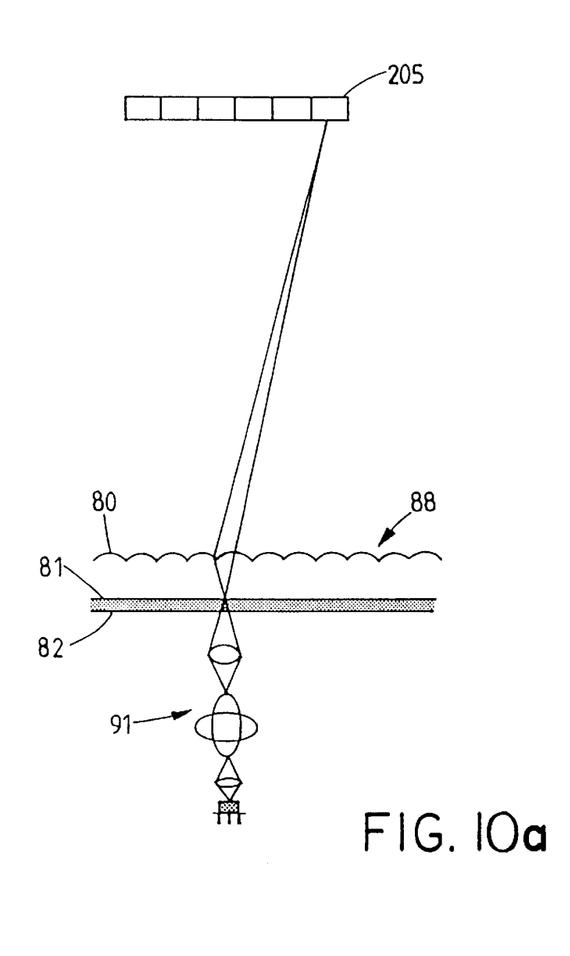
FIGS. 10a and 10b are views corresponding to FIGS. 7a and 7b illustrating the detection of the same pixel position in different parallax barrier or lenticular screen imaging lobes of the transmitted light.
Figure 10B:
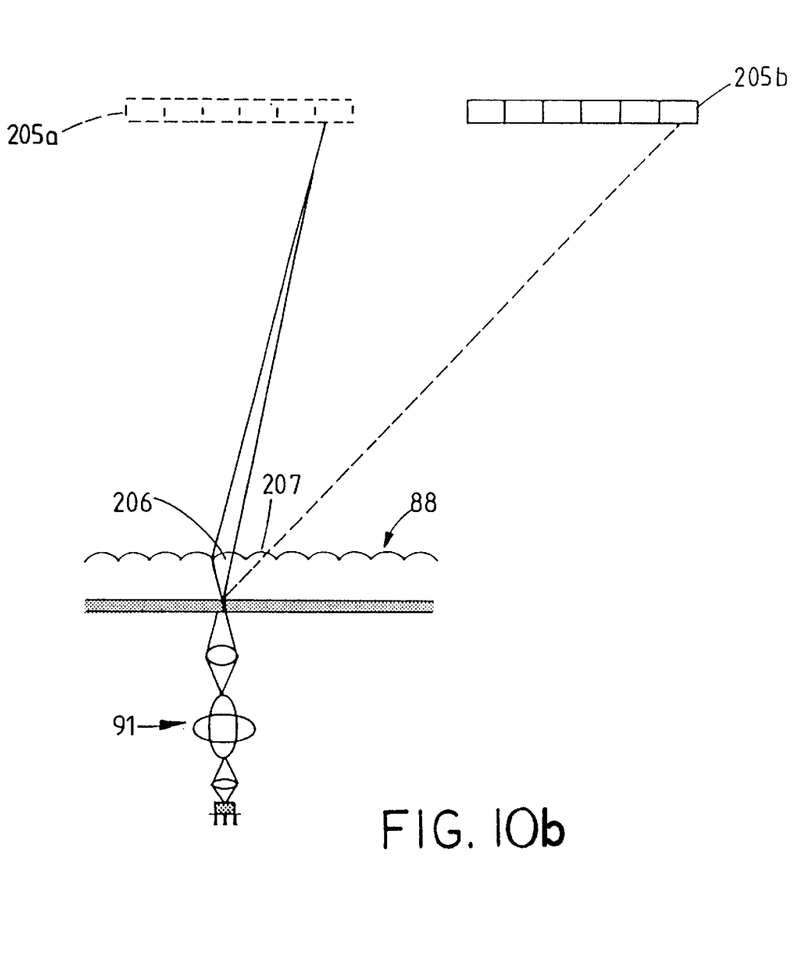

It will be appreciated that light transmitted through the lenticular sheet 88 will produce a plurality of lenticular screen imaging lobes. If the image cone from the laser writing system is smaller than the subtended angle of the lenticular screen, or if a non-telecentric writing scheme is used, then it is possible that no light will reach the corresponding "zero lobe" detector or detector element. One way of overcoming this is to make the transferred colourant diffusing for the laser light. An alternative would be to attach a diffusing layer to the rear of the lenticular screen. Either of these alternatives would expand the aperture of the incident laser light. By way of example, the intensity of the light received by each detector element in the calculated example would drop from 40 uW to 1 uW. Alternatively, as illustrated in FIG. 10b, the detector array can be positioned so as to detect the zero and/or first order or higher order lobes. Since the angular relationship between adjacent image cones is a fixed one, measurement of one order of lobe will give precise information on the other orders. In FIG. 10a, the detector is positioned for the zero lobe, and this is satisfactory for points in the middle region of the overall image, and is satisfactory for incident laser light of sufficiently great numerical aperture. In FIG. 10b, the detector array 205a is duplicated at 205b so as to detect the image cone from a neighbouring lenticule 207 instead of the immediately adjacent lenticule 206. Since the angular relationship between two image cones is fixed, measurement of one lobe gives information on the other lobes.

The detectors may be a one-dimensional array of photo-sensitive elements, a position-sensitive detector, or a number of separate detector elements.

The aberrational performance of the light imaged into higher order lobes may be different from that imaged into the zero order lobe. To compensate for this, it may be necessary to vary the positioning of the detector, or the detector array, in the higher order lobes, or to adjust the detector signals electronically, for example by introducing a variable delay.

In the example shown in FIG. 11, a single detector 112 is used. The full-screen size cylindrical lens 111 on the output surface of the lenticular sheet 88 focuses the incident ray bundle towards a detector on the optical axis. The fast scan axis in this example is orthogonal to the lenticules, but it could alternatively be parallel to the lenticules. In this example, the entire two-dimensional image for the first parallax view is written over the entire lenticular sheet 88, by fast and slow scanning. After this, the process is repeated for the second parallax view, and so on. The registration control system controls the spot position to maintain it on the centre of the detector, as described above. One detector 112b is provided for the zero lobe; one detector 112a is provided for the +1 lobe; and one detector 112c is provided for the –1 lobe. For each successive parallax view, of which seven are shown in this example, the three detectors 112a, 112b and 112c are translated, as shown by arrows 113, 114 and 115. However, it may not be necessary to detect the first order images, in which case only detector 112b would be provided.

A possible disadvantage of the system shown in FIG. 11 is the need for a full screen size cylindrical lens 111, and the possibility of additional dead time in the scanning between writing spots, slowing down the overall process; and the need for an additional translation system for the detector or detectors.

To optimize the discrimination of the position of a two-dimensional pixel view, the optical scanning system 91 can be arranged to emit a high intensity short duration pre-pulse, insufficient to cause coloured dye transfer, but sufficient to cause the or each detector to provide a signal.

As described above, colour printing requires each colour separation to be imaged onto the lenticular sheet, so that the beam used for print register control has to be transmitted not only through the coloured dye sheet currently being printed but also through previously-written dye dots at the same pixel position. For example, when printing the cyan separation, the sensing beam must pass also through the previously-written yellow and magenta dots at the same pixel position.

One solution would be to provide a laser-absorbing dye with chemical properties such that its ability of absorbing the electromagnetic radiation, in one example infra-red (IR), is partially or completely destroyed in the writing/transfer process or does not transfer completely to the receiving layer. Thus the transmissivity of the dye layer for the writing beam would be increased for subsequent writing/detection processes. Discrimination of the detected signal for second and subsequent separations would then be improved.

Figure 12:
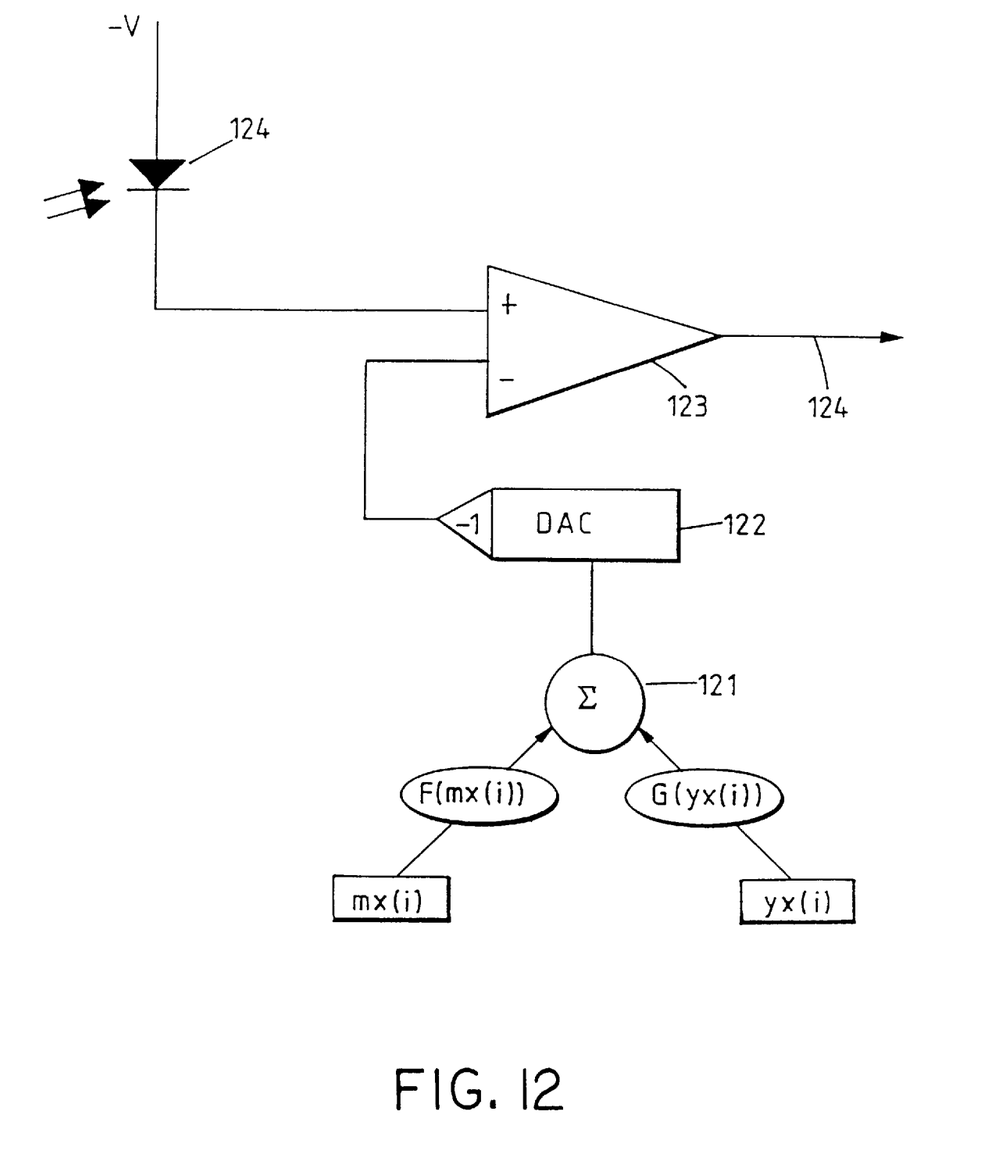
FIG. 12 is a schematic circuit diagram of a position detecting circuit for print register control.

Alternatively, and as illustrated in the position-detecting circuit of FIG. 12, a knowledge of the previously-written data values for the written pixel is used to improve signal discrimination. In FIG. 12, a position-detecting circuit, forming part of the print registration control system, comprises a summing unit 121 whose output is connected to a digital to analogue converter 122 whose output is inverted and supplied to a comparator 123. The other input of the comparator 123 is connected to receive the output signal from the, or one of the detectors or detector elements 124, represented here as a light sensitive diode with a voltage bias –V. The output 124 of the comparator 123 represents the difference between the currently-detected value and a predicted threshold value for the same pixel. The provision of a difference value instead of an absolute value leads to better discrimination. In this example, the order of colour separation printing is yellow, magenta, cyan, and the data values for magenta and yellow respectively are mx (i) and yx (i). During the initial printing of the yellow separation, the data value yx (i) is zero; during the printing of the yellow and magenta separations, the data value of mx (i) is zero and yx (i) may be non-zero. As shown in FIG. 12, the position detecting circuit computes function F (mx(i)), the amount of laser absorber transferred for a given pixel intensity of magenta, and feeds this function into the summer 121. Correspondingly, the circuit computes the function G (yx(i)), which is the amount of laser absorber transferred for a given pixel intensity of yellow, and feeds this output into the summer 121. Thus the summer 121 computes a sum corresponding to the absorptivity of the substrate, at that pixel, corresponding to the amount of laser absorber transferred.

Further, whether or not the system of FIG. 12 is used, it is possible to arrange the print register control system so as to use reference positions lying between adjacent parallax views. The detectors would be positioned accordingly. This would give positional information for each pixel of each parallax view, since the centre of the pixel would be the midpoint between the two adjacent reference positions. The exposure of the spot for that pixel could be controlled more accurately, for example using pulse width modulation (PWM) of the output of the writing laser beam.

Compensation for chromatic variations in the refractive index of the lenticular sheet 88, which arise from the difference in wavelengths between the writing laser and the visible illumination used for reading, may be compensated for in the print register control system. For example, the positioning of the detector or detector array may be adjusted to provide appropriate compensation.

It is thus possible to provide a 3D printer of relatively compact and simple construction which is capable economically of providing 3D printed hard-copies. Such a printer may be used, for instance, to provide 3D computer aided design output, facsimile output, medical imaging, and virtual reality hard-copy. The printer may be used to print from images captured by photographic or video means, or may be used to print synthesised images, for instance synthesised by a computer. The printer is suitable for providing desk top computer 3D output.

What is claimed is:

1. A method of making a print containing parallax information, comprising:

writing a plurality of picture elements, each of the plurality of picture elements comprising a plurality of interlaced image elements from respective images, onto a first substrate, wherein the first substrate is associated with a lens array or a parallax barrier, such that each of the plurality of picture elements is associated with a respective lens of the lens array or aperture of the parallax barrier, scanning the first substrate with a beam of radiation such that at least some of the radiation passes through the first substrate and a lens of the lens array or an aperture of the parallax barrier associated with a picture element currently being written or adjacent thereto;

detecting at least some of the radiation passing through the lens array or the parallax barrier and arriving at at least one predetermined position relative to the lens or aperture; and controlling registration of the respective lens or aperture and the picture element associated with the respective lens or aperture in response to the detection.

2. A method as claimed in claim 1, comprising the step of providing the first substrate with the lens array or the parallax barrier.

3. A method as claimed in claim 1, comprising the step of forming the lens array or parallax barrier on another substrate which is disposed at least temporarily in juxtaposition with the first substrate before the writing.

4. A method as claimed in claim 1, comprising the step of utilizing the beam of radiation for writing the picture elements.

5. A method as claimed in claim 4, comprising the step of writing the picture elements onto the first substrate by selectively transferring colourant comprising at least one of dye, dye precursor, pigment, ink, and toner.

6. A method as claimed in claim 5, comprising the step of selectively transferring the colourant from a second substrate comprising a colourant donor substrate.

7. A method as claimed in claim 6, comprising the step of transferring the colourant donor substrate which is in contact with the first substrate during transfer.

8. A method as claimed in claim 5, comprising the step of transferring the colourant thermally.

9. A method as claimed in claim 8, comprising the step of transferring the colourant by scanning a colourant donor substrate with at least one modulated electromagnetic beam.

10. A method as claimed in claim 1, further comprising the step of writing black data between adjacent picture elements.

11. A method as claimed in claim 1, comprising the step of detecting the radiation at a plurality of predetermined positions relative to the at least one aperture or lens.

12. A method as claimed in claim 1, wherein the step of controlling registration includes controlling, in response to the detection, a relative position of the respective lens or aperture and the picture element associated with the respective lens or aperture in a direction substantially normal to a direction of the beam of radiation as the beam of radiation passes through the respective lens or aperture.

13. A process for making a colour print, comprising a first method for printing a first colour and a second method for printing a second colour, each of the first method and the second method being a method as claimed in claim 1, registration in the second method being further controlled in response to radiation absorption of each picture element.

14. A process as claimed in claim 13, comprising the radiation absorption of each picture element is determined from a value of the picture element.

15. An apparatus for making a print containing parallax information, comprising:

writing means for writing a plurality of picture elements, each of the plurality of picture elements comprising a plurality of interlaced image elements from respective images, onto a first substrate, wherein the first substrate is associated with a lens array or a parallax barrier, such that each of the plurality of picture elements is associated with a respective lens of the lens array or aperture of the parallax barrier;

scanning means for scanning the first substrate with a beam of radiation such that at least some of the radiation passes through the first substrate and a lens of the lens array or an aperture of the parallax barrier associated with the picture element currently being written or adjacent thereto;

detecting means for detecting at least some of the radiation passing through the lens array or the parallax barrier and arriving at at least one predetermined position relative to the lens or aperture; and means for controlling registration of the respective lens or aperture and the picture element associated with the respective lens or aperture in response to the detecting means.

16. An apparatus as claimed in claim 15, wherein the writing means includes the scanning means.

17. An apparatus as claimed in claim 15, wherein the scanning means is arranged to transfer, by means of the beam of radiation, colourant from a second substrate onto the first substrate so as to write the picture elements.

18. An apparatus as claimed in claim 15, comprising the means for controlling registration includes means for controlling, in response to the detection, a relative position of the respective lens or aperture and the picture element associated with the respective lens or aperture in a direction substantially normal to a direction of the beam of radiation as the beam of radiation passes through the respective lens or aperture.

* * * * *